US012790986B2

(12) United States Patent
Rodriguez Erdmenger et al.

(10) Patent No.: US 12,790,986 B2
(45) Date of Patent: Nov. 10, 2026

(54) ENGINE CASING WASTE HEAT RECIRCULATION LOOP AND ASSOCIATED METHOD

(71) Applicants: General Electric Company, Schenectady, NY (US); General Electric Deutschland Holding GmbH, Frankfurt (DE)

(72) Inventors: Rodrigo Rodriguez Erdmenger, Garching (DE); Adam Joseph Wangler, Evendale, OH (US); Massimiliano Cirri, Garching (DE); Maysaa Rizk, Garching (DE); Giridhar Jothiprasad, Niskayuna, NY (US); Christian Aalburg, Garching (DE)

(73) Assignees: General Electric Company, Evendale, OH (US); General Electric Deutschland Holding GmbH, Frankfurt (DE)

(*) Notice: Subject to any disclaimer, the term of this patent is extended or adjusted under 35 U.S.C. 154(b) by 0 days.

(21) Appl. No.: 18/101,966

(22) Filed: Jan. 26, 2023

(65) Prior Publication Data

US 2024/0254926 A1 Aug. 1, 2024

(51) Int. Cl.
*F02C 9/18* (2006.01)
*F02C 6/08* (2006.01)
(Continued)

(52) U.S. Cl.
CPC .................. *F02C 9/18* (2013.01); *F02C 6/08* (2013.01); *F02C 7/14* (2013.01); *F04D 29/04* (2013.01);
(Continued)

(58) Field of Classification Search
None
See application file for complete search history.

(56) References Cited

U.S. PATENT DOCUMENTS 2,418,801 A * 4/1947 Baumann .............. F04D 27/023 415/37
2,656,096 A * 10/1953 Schwarz ............... F04D 29/684 417/323
(Continued)

FOREIGN PATENT DOCUMENTS

EP 0871853 B1 1/2004

OTHER PUBLICATIONS

European Patent Office, "Extended European Search Report," issued in connection with European Patent Application No. 24150421.6, dated Jun. 21, 2024, 8 pages.

*Primary Examiner* — Juan G Flores
(74) *Attorney, Agent, or Firm* — Hanley, Flight & Zimmerman, LLC

(57) ABSTRACT

Casing waste heat recirculation loops and related methods are disclosed. An example engine includes at least one of a compressor or a pump; a casing for at least one of the pump or the compressor, the casing including a conduit formed in a wall of the casing, the conduit to define a recirculation flow path for a fluid at least partially within the wall of the casing; a valve positioned at an inlet to the recirculation flow path; and an actuator operatively connected to the valve and configured to adjust a position of the valve among at least one of open, partially open, or closed, the valve to allow passage of at least a portion of the fluid when at least one of open or partially open.

10 Claims, 11 Drawing Sheets

(51) Int. Cl.
*F02C 7/14* (2006.01)
*F04D 29/04* (2006.01)

(52) U.S. Cl.
CPC .... *F05D 2220/60* (2013.01); *F05D 2260/213* (2013.01); *F05D 2260/53* (2013.01); *F05D 2270/101* (2013.01); *F05D 2270/301* (2013.01); *F05D 2270/303* (2013.01); *F05D 2270/306* (2013.01); *F05D 2270/66* (2013.01)

(56) References Cited

U.S. PATENT DOCUMENTS

| | | | | |
|---|---|---|---|---|
| 3,217,655 | A * | 11/1965 | Sercy | F04D 15/00 415/147 |
| 6,699,008 | B2 * | 3/2004 | Japikse | F04D 29/688 415/58.4 |
| 6,823,675 | B2 * | 11/2004 | Brunell | G05B 23/0291 60/773 |
| 8,397,506 | B1 | 3/2013 | Wright et al. | |
| 9,611,857 | B2 * | 4/2017 | Giove | F04D 27/0223 |
| 9,638,201 | B2 * | 5/2017 | LeBlanc | F02C 6/08 |
| 9,856,884 | B2 * | 1/2018 | Dierksmeier | F02C 9/18 |
| 10,436,074 | B2 | 10/2019 | Hinders et al. | |
| 10,794,274 | B2 | 10/2020 | Itoh et al. | |
| 11,073,169 | B2 | 7/2021 | Thatte | |
| 11,143,104 | B2 * | 10/2021 | Pal | F02C 9/00 |
| 11,225,905 | B1 | 1/2022 | Holley et al. | |
| 2004/0123600 | A1 * | 7/2004 | Brunell | F02C 9/00 60/773 |
| 2013/0340440 | A1 * | 12/2013 | LeBlanc | F04D 27/023 60/785 |
| 2014/0341708 | A1 * | 11/2014 | Dierksmeier | F04D 27/0238 415/115 |
| 2015/0308442 | A1 * | 10/2015 | Giove | F04D 27/0223 415/58.4 |
| 2016/0084145 | A1 * | 3/2016 | Fulton | F04D 15/0011 415/118 |
| 2017/0254229 | A1 | 9/2017 | Fletcher | |
| 2019/0257247 | A1 * | 8/2019 | Pal | F02C 7/18 |
| 2020/0224557 | A1 | 7/2020 | McAuliffe et al. | |
| 2020/0224588 | A1 | 7/2020 | Somanath et al. | |
| 2020/0224589 | A1 | 7/2020 | McAuliffe et al. | |
| 2020/0224590 | A1 | 7/2020 | McAuliffe et al. | |
| 2020/0248619 | A1 * | 8/2020 | Romero | F02C 9/18 |
| 2021/0199025 | A1 | 7/2021 | Prabhudharwadkar et al. | |
| 2021/0348627 | A1 | 11/2021 | Thatte | |

* cited by examiner

ENGINE CASING WASTE HEAT RECIRCULATION LOOP AND ASSOCIATED METHOD

FIELD OF THE DISCLOSURE

This disclosure relates generally to gas turbine engines and, more particularly, to improved recirculation loops and associated methods.

BACKGROUND

Turbine engines are some of the most widely used power generating technologies. Gas turbines are an example of an internal combustion engine that uses a burning air-fuel mixture to produce hot gases that spin the turbine, thereby generating power. Application of gas turbines can be found in aircraft, trains, ships, electrical generators, gas compressors, and pumps. For example, modern aircraft rely on a variety of gas turbine engines as part of a propulsion system to generate thrust, including a turbojet, a turbofan, a turboprop, and an afterburning turbojet. Such engines include a combustion section, a compressor section, a turbine section, and an inlet, providing high power output with a high thermal efficiency.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

DETAILED DESCRIPTION

Figure 1:
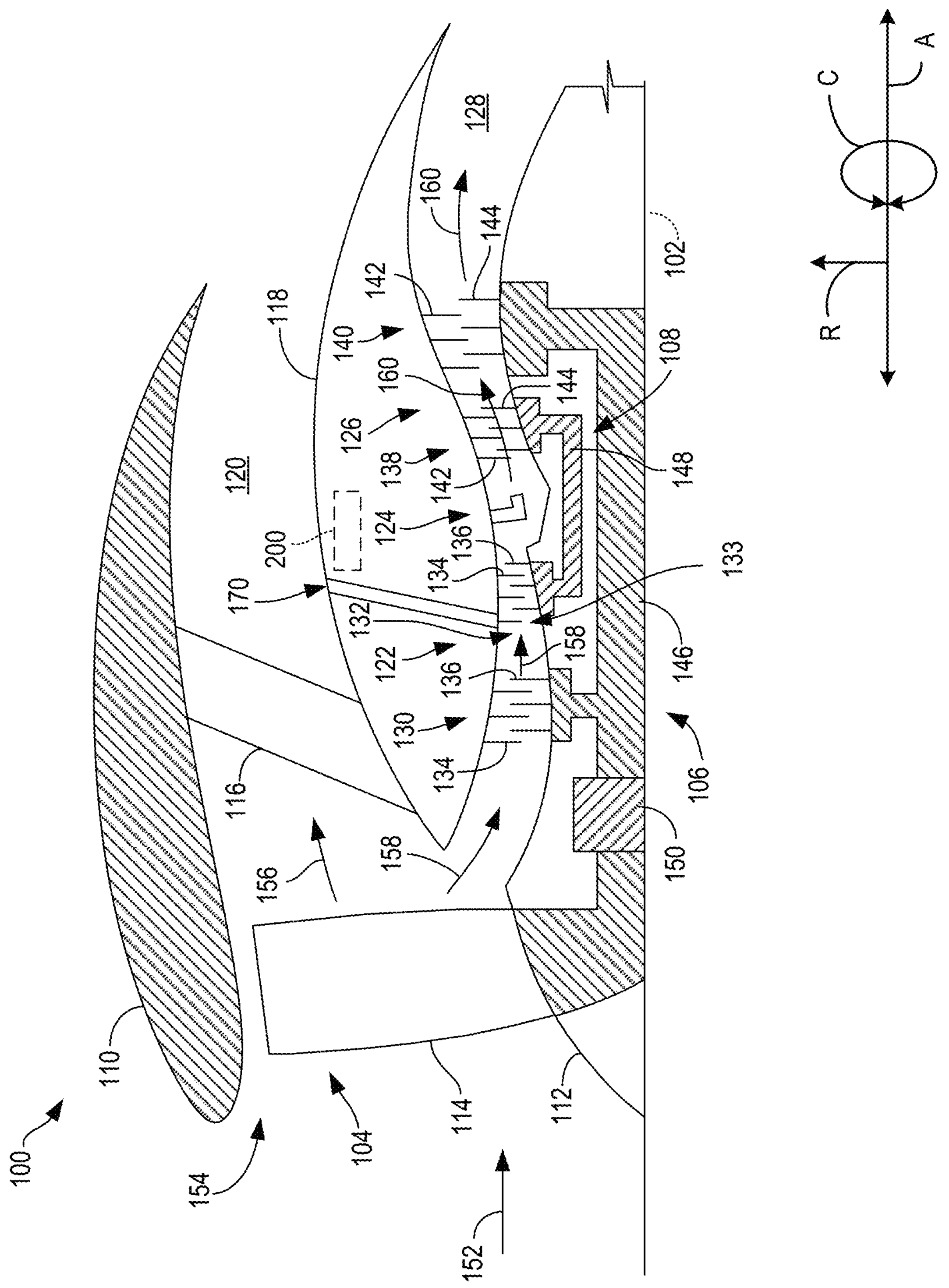
FIG. 1 is a schematic cross-sectional view of an example gas turbine.

A combustion process for a gas turbine engine produces heat or thermal energy as part of the process to generate power. At least a portion of the thermal energy produced in the combustion process is wasted. Certain examples provide improved turbofan engine cycle waste-heat recovery loops, also referred to herein as a thermal waste-heat management system. Certain examples improve operation of pumps or compressors used to recirculate supercritical carbon dioxide (sCO2), water, or other heat exchange fluids for waste-heat recovery applications. Certain examples incorporate recirculation loops into the casing for a turbofan engine, providing a compact way of recirculating supercritical carbon dioxide or other similar fluids. Certain examples include a rotating valve to control the entrance of supercritical carbon dioxide or other similar fluids into the recirculation loop.

The integral recirculation loop with valve helps to regulate combustion in the engine by balancing a pressure ratio of the pump and/or compressor with fluid flow for the gas turbine engine. The recirculation valve enables an increase in fluid flow through at least one compressor by recirculating a portion of the flow such that the respective compressor is operating at a higher flow while a downstream compressor and/or combustion chamber is operating at a lower flow. Such a disparity in flow rate is achievable with the recirculation loop. Without such a recirculation loop, as mass or volume flow moves with respect to a pressure ratio and reaches a stall line, the pump can become unstable, rendering it difficult to operate the compressor.

Additionally, the recirculation loop can be engaged at start-up to heat up the pump and/or compressor. As such, the recirculation loop can be engaged to manage compressor/combustor performance, compressor startup, and waste-heat management, for example. Adding a valve and/or other regulator provides control and flexibility to engage the recirculation loop. External piping, valve, and reinjection location is bulky and difficult to package. Certain examples incorporate the recirculation loop into the engine casing to avoid increasing the size of the engine. In certain examples, the casing includes sufficient space to incorporate the recirculation loop without increasing the size of the casing.

In certain examples, the valve can be implemented using a pair of concentric rings with holes. When the openings in the rings are at least partially aligned, fluid is allowed to flow into the casing (into the recirculation loop or piping in the casing). Depending on the extent of hole alignment between the rings, some fluid may not enter the recirculation loop and continues on its path. When the openings of the rings are not aligned at all, then no fluid can enter the recirculation loop. In certain examples, one ring is stationary (e.g., incorporated into the casing or otherwise forming a part of the casing itself such as openings or holes in the casing, etc.), and the other ring is actuated to rotate around an inner circumference of the casing, move axially, etc. Actuation can be driven by an electric motor in the casing, an electromagnet, a servomotor, spring-loaded, etc.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "upstream" and "downstream" refer to the relative direction with respect to fluid flow in a fluid pathway. For example, "upstream" refers to the direction from which the fluid flows, and "downstream" refers to the direction to which the fluid flows.

Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, an object is substantially specifically if the object has a radius that vary within 15% of the average radius of the object.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow.

The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

Referring now to the figures, FIG. 1 is a schematic cross-sectional view of an example gas turbine engine 100 in which the presently described technology can be implemented. In the illustrated example of FIG. 1, the engine 100 is configured as a high-bypass turbofan engine. However, in alternative examples, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown in the example of FIG. 1, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 may generate thrust to propel an aircraft. More specifically, during operation, air (indicated by arrow 152) enters an inlet portion 154 of the engine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, driving the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, thereby driving the LP compressor 130 and the fan 104 via the gearbox 150. The combustion gases 160 then exit the engine 100 through the exhaust section 128.

The engine 100 may include a thermal waste-heat management system 200 for recovering heat from the combustion gases 160. The thermal waste-heat management system 200 is positioned within the outer casing 118 of the engine 100. However, in alternative examples, the thermal waste-heat management system 200 may be positioned at other location(s) within the engine 100. For example, other location(s) can include the nacelle 110, the compressor section 122, the combustor section 124, the turbine section 126, or the exhaust section 128, or any combination thereof.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows a portion of the compressed air 158 from the compressor section 122 to bypass the combustion section 124. More specifically, in some examples, the third-stream flow path 170 may define a concentric or non-concentric passage relative to the compressed air flow path 133 downstream of one or more of the compressors 130, 132 or the fan 104. The third-stream flow path 170 may be configured to selectively remove a portion of compressed air 158 from the compressed air flow path 133 via one or more variable guide vanes, nozzles, or other actuatable flow control structures. In addition, as will be described below, in some examples, the thermal waste-heat management system 200 may transfer heat to the air flowing through the third-stream flow path 170. However, a pressure and/or a flow rate of a fluid (e.g., a heat exchange fluid such as a supercritical fluid (e.g., supercritical carbon dioxide ($sCO_2$), water, etc.), etc.) within the thermal waste-heat management system 200 limits a rate at which thermal energy is transferred between the air and the heat exchange fluid. Additionally, it is advantageous for the thermal waste-heat management system 200 to produce the pressure and/or the flow rate with components (e.g., pump systems) that minimize and/or otherwise reduce a physical size and/or weight of the thermal waste-heat management system 200 and/or the components (e.g., pump systems) included therein. Moreover, the thermal waste-heat management system 200 may ensure that the heat exchange fluid is free of contaminants when thermal energy is to be transferred.

The configuration of the gas turbine engine 100 described above and shown in FIG. 1 is provided as one example in which the present disclosure can be applied. As such, the present subject matter can be readily adaptable to variety of gas turbine engine configurations, including other types of aviation-based gas turbine engines, marine-based gas turbine engines, and/or land-based/industrial gas turbine engines.

Figure 2:
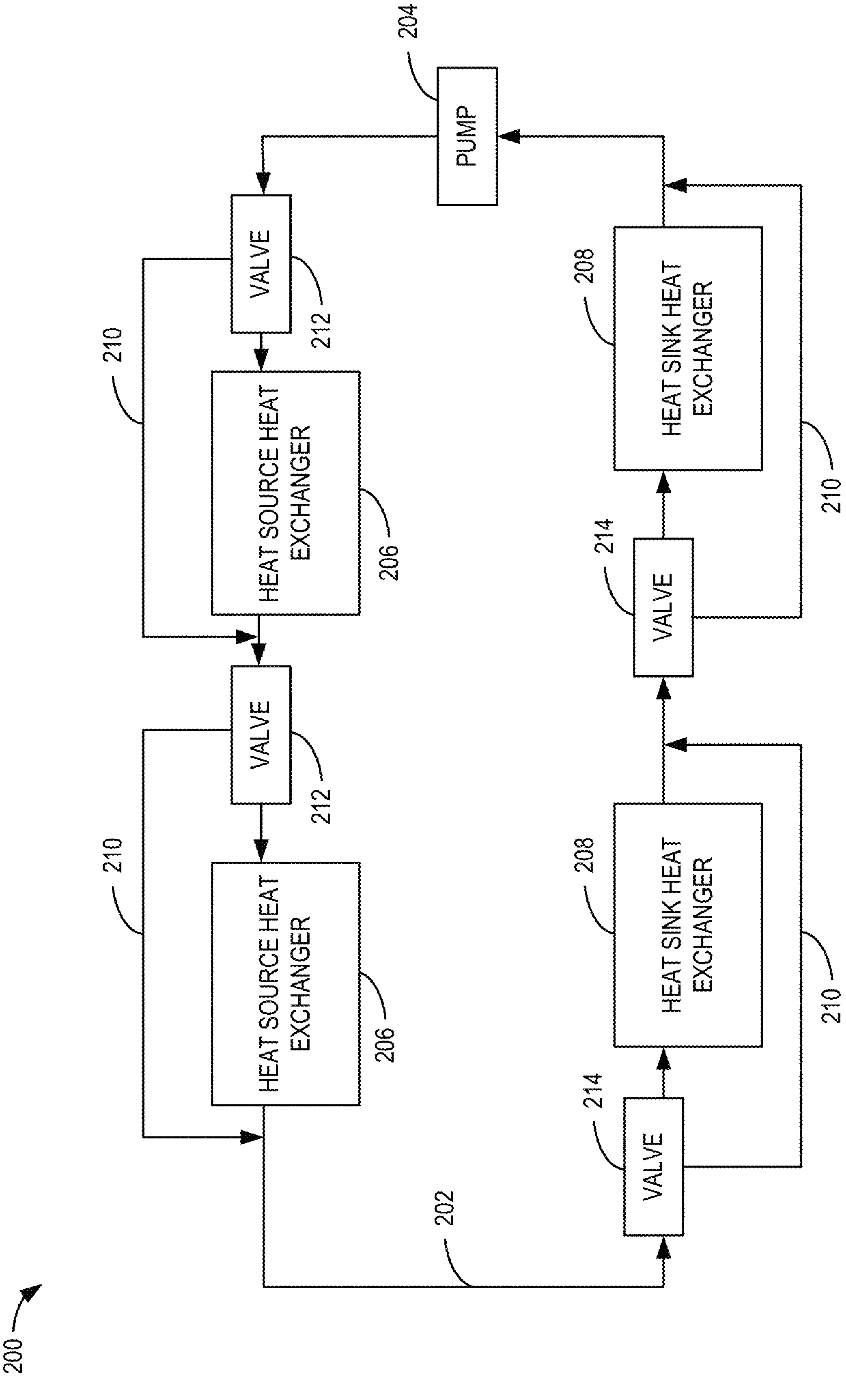
FIG. 2 is a schematic diagram of an example thermal waste-heat management system for transferring heat between fluids.

FIG. 2 is a schematic view of an example implementation of the thermal waste-heat management system 200 for transferring heat between fluids. In general, the thermal waste-heat management system 200 will be discussed in the context of recovering heat from the combustion gases 160 exiting the combustion section 124 of the gas turbine engine 100. However, the disclosed thermal waste-heat management system 200 can be implemented within a variety of waste-heat recovery environments. In the context of the gas turbine engine 100, the thermal waste-heat management system 200 can be referred to as part of the plant.

As shown in the example of FIG. 2, the thermal waste-heat management system 200 includes a thermal transport bus 202. Specifically, in several examples, the thermal transport bus 202 is configured as one or more fluid conduits through which a fluid (e.g., a heat exchange fluid) flows. As will be described below, the heat exchange fluid flows through various heat exchangers such that heat is added to and/or removed from the heat exchange fluid. In this respect, the heat exchange fluid (also referred to as a working fluid) may be any suitable fluid, such as supercritical carbon dioxide, water, etc. Moreover, in such examples, the thermal waste-heat management system 200 includes a pump 204 configured to move the heat exchange fluid through the thermal transport bus 202.

Additionally, the thermal waste-heat management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger (s) 206. In this respect, the heat source heat exchanger(s) 206 is configured to transfer heat from fluids supporting the operation of the engine 100 to the heat exchange fluid based on a difference in temperatures between the fluids, cooling the fluids supporting the operation of the engine 100. More specifically, it will be understood that the fluids supporting the operation of the gas turbine engine 100 are at a higher temperature than the working fluid or heat exchange fluid of the thermal waste-heat management system 200. Thus, the heat source heat exchanger(s) 206 adds heat to the heat exchange fluid. Although FIG. 2 illustrates two heat source heat exchangers 206, the thermal waste-heat management system 200 may include any suitable number of heat source heat exchangers including a single heat source heat exchanger 206 or three or more heat source heat exchangers 206.

The heat source heat exchanger(s) 206 may correspond to heat exchanger(s) that cool a fluid supporting the operation of the aircraft 10. For example, at least one of the heat exchanger(s) 206 is a heat exchanger(s) of the lubrication system(s) of the engine(s) 100. In such an example, the heat exchanger(s) 206 transfers heat from the oil lubricating the engine(s) 100 to the heat transfer fluid. In another example, at least one of the heat exchangers 206 is a heat exchanger(s) of the cooling system of the engine(s) 100. In such an example, this heat exchanger(s) 206 transfers heat from the cooling air bled from the compressor section(s) 122 (or a compressor discharge plenum) of the engine(s) 100 to the heat transfer fluid. However, in alternative examples, the heat source heat exchanger(s) 206 may correspond to other heat exchangers that cool a fluid supporting the operation of the engine 100.

Furthermore, the thermal waste-heat management system 200 includes one or more heat sink heat exchangers 208 arranged along the thermal transport bus 202. More specifically, the heat sink heat exchanger(s) 208 are fluidly coupled to the thermal transport bus 202 such that the heat exchange fluid flows through the heat sink heat exchanger(s) 208. In this respect, the heat sink heat exchanger(s) 208 are configured to transfer heat from the heat exchange fluid to other fluids supporting the operation of the engine 100, which heats the other fluids supporting the operation of the engine 100. Thus, the heat sink heat exchanger(s) 208 remove heat from the heat exchange fluid. Although FIG. 2 illustrates two heat sink heat exchangers 208, the thermal waste-heat management system 200 may include three or more heat sink heat exchangers 208. The thermal waste-heat management system 200 may also include one heat sink heat exchanger 208.

The heat sink heat exchanger(s) 208 may correspond to heat exchanger(s) that heat a fluid supporting the operation of the aircraft 10 (e.g., supporting operation of the engine(s) 100 of the aircraft 10, etc.). More specifically, it will be understood that the fluids supporting the operation of the aircraft 10 are at a lower temperature than the working fluid or heat exchange fluid of the thermal waste-heat management system 200. For example, at least of one of the heat exchanger(s) 208 is a heat exchanger(s) of the fuel system(s) of the engine(s) 100. In such an example, the fuel system heat exchanger(s) 208 transfers heat from the heat transfer fluid to the fuel supplied to the engine(s) 100. In another example, at least one of the heat exchanger(s) 208 is a heat exchanger(s) in contact with the air 156 flowing through the bypass airflow passage(s) 120 of the engine(s) 100. In such an example, the heat exchanger(s) 208 transfers heat from the heat exchange fluid to the air 156 flowing through the bypass airflow passage(s) 120.

In several examples, one or more of the heat exchanger(s) 208 are configured to transfer heat to the air flowing through the third-stream flow path 170. In such examples, the heat exchanger(s) 208 is in contact with the air flow through the third-stream flow path 170. Thus, heat from the heat exchange fluid flowing through the thermal transport bus 202 may be transferred to the air flow through the third-stream flow path 170. The use of the third-stream flow path 170 as a heat sink for the thermal waste-heat management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, allowing the heat exchanger(s) 208 to be smaller than heat exchangers relying on other heat sinks within the engine. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in alternative examples, the heat sink heat exchangers 208 may correspond to other heat exchangers that heat a fluid supporting the operation of the aircraft 10.

Moreover, in several examples, the thermal waste-heat management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat exchangers 206, 208. In some examples, the heat exchange fluid bypasses one or more of the heat exchangers 206, 208 to adjust the temperature of the heat exchange fluid within the thermal transport bus 202. The flow of example heat exchange fluid through the bypass conduit(s) 210 is controlled to regulate the pressure of the heat exchange fluid within the thermal transport bus 202. In the illustrated example of FIG. 2, each heat exchanger 206, 208 has a corresponding bypass conduit 210. However, in alternative examples, any number of heat exchangers 206, 208 may have a corresponding bypass conduit 210 so long as there is at least one bypass conduit 210 (e.g., on a hot section of the respective heat exchanger 206, 208, etc.).

Additionally, in several examples, the thermal waste-heat management system 200 includes one or more heat source valves 212 and one or more heat sink valves 214. In general, each heat source valve 212 is configured to control the flow of the heat exchange fluid through a bypass conduit 210 that bypasses a heat source heat exchanger 206. Similarly, each heat sink valve 214 is configured to control the flow of the heat exchange fluid through a bypass conduit 210 that bypasses a heat sink heat exchanger 208. In this respect, each heat source valve 212 and each heat sink valve 214 is fluidly coupled to the thermal transport bus 202 and a corresponding bypass conduit 210. As such, each heat source valve 212 and each heat sink valve 214 may be moved between fully and/or partially opened and/or closed positions to selectively occlude the flow of heat exchange through its corresponding bypass conduit 210.

The heat source valve(s) 212 and the heat sink valve(s) 214 are controlled based on the pressure of the heat exchange fluid within the thermal transport bus 202. More specifically, as indicated above, in certain instances, the pressure of the heat exchange fluid flowing through the thermal transport bus 202 may fall outside of a desired pressure range. When the pressure of the heat exchange fluid is too high, the thermal waste-heat management system 200 may incur accelerated wear. In this respect, when the pressure of the heat exchange fluid within the thermal transport bus 202 exceeds a maximum or otherwise increased pressure value, one or more heat source valves 212 open. In such instances, at least a portion of the heat exchange fluid flows through the bypass conduits 210 instead of the heat source heat exchanger(s) 206. Thus, less heat is added to the heat exchange fluid by the heat source heat exchanger(s) 206, reducing the temperature and, thus, the pressure of the fluid. In some examples, the maximum pressure value is between 3800 and 4000 pounds per square inch or less. In some examples, the maximum pressure value is between 2700 and 2900 pounds per square inch, such as 2800 pounds per square inch. In other examples, the maximum pressure value is between 1300 and 1500 pounds per square inch, such as 1400 pounds per square inch. Such maximum pressure values generally prevent the thermal waste-heat management system 200 from incurring accelerated wear.

In some examples, the maximum pressure value is set prior to and/or during operation based on parameters (e.g., materials utilized, pump 204 design, gas turbine engine 100 design, heat exchange fluid, etc.) associated with the thermal waste-heat management system 200. The example maximum pressure value can be adjusted relative to the pressure capacities of the thermal transport bus 202, the pump 204, the heat exchangers 206, 208, the bypass conduit(s) 210, and/or the heat source valve(s) 212 and the heat sink valve(s) 214. Some examples of pump 204 architecture that influence example maximum pressure capacities are described in greater detail below.

Conversely, when the pressure of the heat exchange fluid is too low, the pump 204 may experience operability problems and increased wear. As such, when the pressure of the heat exchange fluid within the thermal transport bus falls below a minimum or otherwise reduced pressure value, one or more thermal sink valves 214 open. In such instances, at least a portion of the heat exchange fluid flows through the bypass conduits 210 instead of the heat sink heat exchangers 208. Thus, less heat is removed from the heat exchange fluid by the heat sink heat exchangers 208, which increases the temperature as well as the pressure of the fluid. In some examples, the minimum pressure value is 1070 pounds per square inch or more. In some examples, the minimum pressure value is between 1150 and 1350 pounds per square inch, such as 1250 pounds per square inch. In other examples, the minimum pressure value is between 2400 and 2600 pounds per square inch, such as 2500 pounds per square inch. Such minimum pressure values are generally utilized when the heat exchange fluid in a supercritical state (e.g., when the heat exchange fluid is supercritical carbon dioxide).

As such, the thermal waste-heat management system 200 may be configured to operate such that the pressure of the heat exchange fluid is maintained with a range extending between the minimum and maximum pressure values. In some examples, the range extends from 1070 to 4000 pounds per square inch. Specifically, in one example, the range extends from 1250 to 1400 pounds per square inch. In another example, the range extends from 2500 to 2800 pounds per square inch.

Accordingly, the operation of the pump 204 and the heat source valve(s) 212 and the heat sink valve(s) 214 allows the disclosed thermal waste-heat management system 200 to maintain the pressure of the heat exchange fluid within the thermal transport bus 202 within a specified range of values as the thermal load placed on the thermal waste-heat management system 200 varies.

Furthermore, the example pump 204 drives the flow of the heat exchange fluid through the thermal waste-heat management system 200. In some examples, the thermal waste-heat management system 200 includes one pump 204 or multiple pumps 204 depending on the desired flow rate, delta pressure across the pump 204, and/or the kinetic energy loss of the heat exchange fluid in the thermal transport bus 202. For example, the pump 204 may increase the output pressure head to accelerate the flow of the heat exchange fluid to a first flowrate. As the heat exchange fluid passes through the thermal transport bus 202, the example kinetic energy of the heat exchange fluid dissipates due to friction, temperature variations, etc. Due to the kinetic energy losses, the heat exchange fluid decelerates to a second flow rate at some point downstream of the pump 204. If the example second flow rate is below a desired operating flow rate of the heat exchange fluid, then the pump 204 can either be of a different architecture that outputs a higher first flow rate, or one or more additional pumps 204 can be included in the thermal waste-heat management system 200.

In certain examples, thermal management of the system 200 can be improved using a recirculation loop to recirculate the heat exchange fluid to increase waste-heat recovery. The heat exchange fluid can be reintroduced to the pump 204 to help manage the system 200 by leveraging waste-heat recovery, etc. Certain examples provide a recirculation loop that is incorporated into an engine casing (e.g., the outer casing 118, etc.) to provide a compact mechanism for recirculating the heat exchange fluid with respect to the pump 204.

Figure 3A:
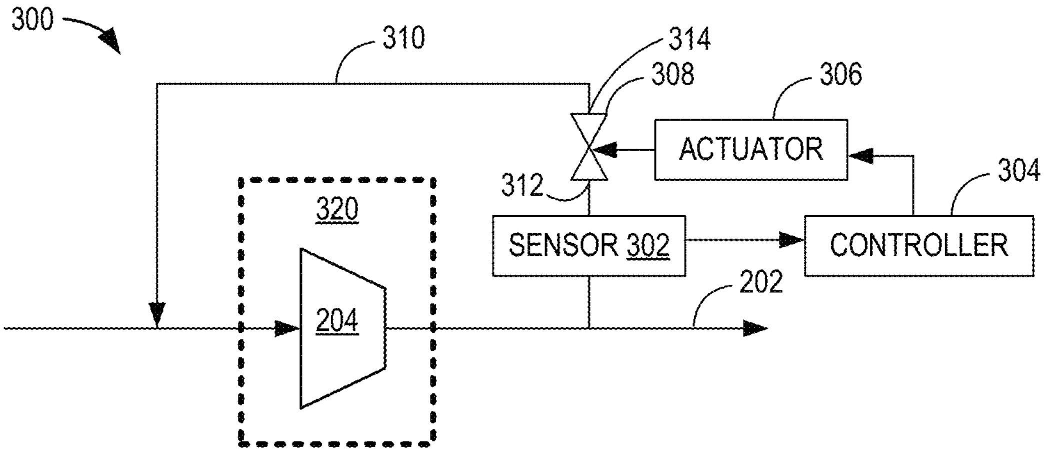
FIGS. 3A-3B are schematic diagrams of a recirculation apparatus for the pump in the example thermal waste-heat management system.
Figure 3B:
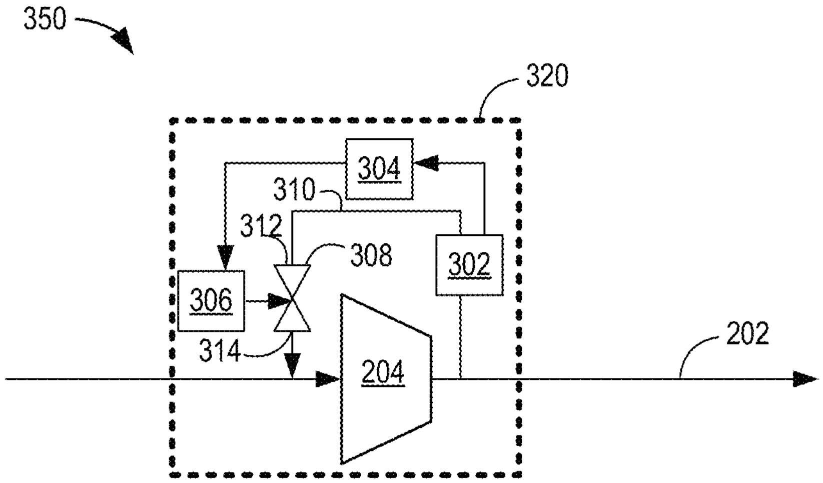

FIGS. 3A-3B illustrate example configurations of a recirculation loop system or apparatus 300 that can be positioned, for example, upstream of and/or otherwise with respect to the pump 204 in the thermal waste-heat management system 200. In the example of FIG. 3A, the pump 204 is connected with one or more sensors 302 to monitor flow parameters (e.g., temperature, flow rate, pressure, etc.) of the heat exchange fluid. The sensor(s) 302 (e.g., including one or more of a temperature sensor, a flow rate sensor, a pressure sensor, etc.) transmit flow parameter readings to a controller 304. The controller 304 is communicatively coupled to an actuator 306, which controls a metering valve 308, based on desired modifications for the flow parameters of the heat exchange fluid. The actuator 306 adjusts the metering valve 308 to at least partially open when a first flow parameter threshold is met. The actuator 306 adjusts the metering valve 308 to at least partially close when a second flow threshold is met. These thresholds and responses to associated flow parameters are incorporated into a set of instructions (see FIG. 9) defining operation of the controller 304. The actuator 306 is a mechanical device, such as a spring-loaded magnet, a stepper motor, or a solenoid, and is mechanically coupled to the metering valve 308, such that any movement of the metering valve 308 is due to a change in position of the actuator 306. The metering valve 308 can be formed of titanium, steel, aluminum, and/or other material selected based on pressure resistance, corrosion resistance, and/or other criterion, for example.

When the metering valve 308 is in an open configuration, the heat exchange fluid enters a recirculation flow path 310, with an inlet 312 positioned at the metering valve 308 and an outlet 314 positioned upstream from the inlet 312, such that the heat exchange fluid returns to the thermal transport bus 202 and flows through the pump 204 after exiting the recirculation flow path 310 at the outlet 314. Conversely, when the metering valve 308 is in a closed configuration, the heat exchange fluid remains in the thermal transport bus 202 of the thermal waste-heat management system 200 and flows through the pump 204 as described in the thermal waste-heat management system 200 process. In some examples, the metering valve 308 is positioned by the actuator 306 such that the metering valve 308 is partially open, enabling flow of the heat exchange fluid through the recirculation flow path 310 at a flow rate that is less than when the metering valve 308 is in the fully open configuration. As such, the metering valve 308 can be positioned as fully closed, fully open, or somewhere in between.

FIG. 3B illustrates an alternative configuration 350 in which the recirculation path 310 and the actuator 306 are arranged inside a casing 320 of the pump 204. While shown here in the context of the pump casing 320, the recirculation path or loop 310 can also be formed in another engine component casing, for example. As shown in the example of FIG. 3B, the recirculation loop 310 is formed (e.g., as a conduit or passage, etc.) within the housing or casing 320 of the pump 204, along with the loop 310, the metering valve 308, the actuator 306, the sensor 302, and the controller 304. This compact design reduces an amount of piping or conduit, reduces area occupied by the recirculation apparatus 350, and reduces a weight added by the recirculation apparatus 300. As such, the system can be streamlined, pump 204 and engine operation can improve, and spacing/weight/area can be reduced by incorporating the recirculation apparatus 350 into the casing 320. The metering valve 308 can be formed of a same or different compatible material than the casing 320 based on one or more criterion such as pressure resistance, heat resistance, corrosion resistance, etc. (e.g., aluminum, steel, titanium, etc.).

Figure 4:
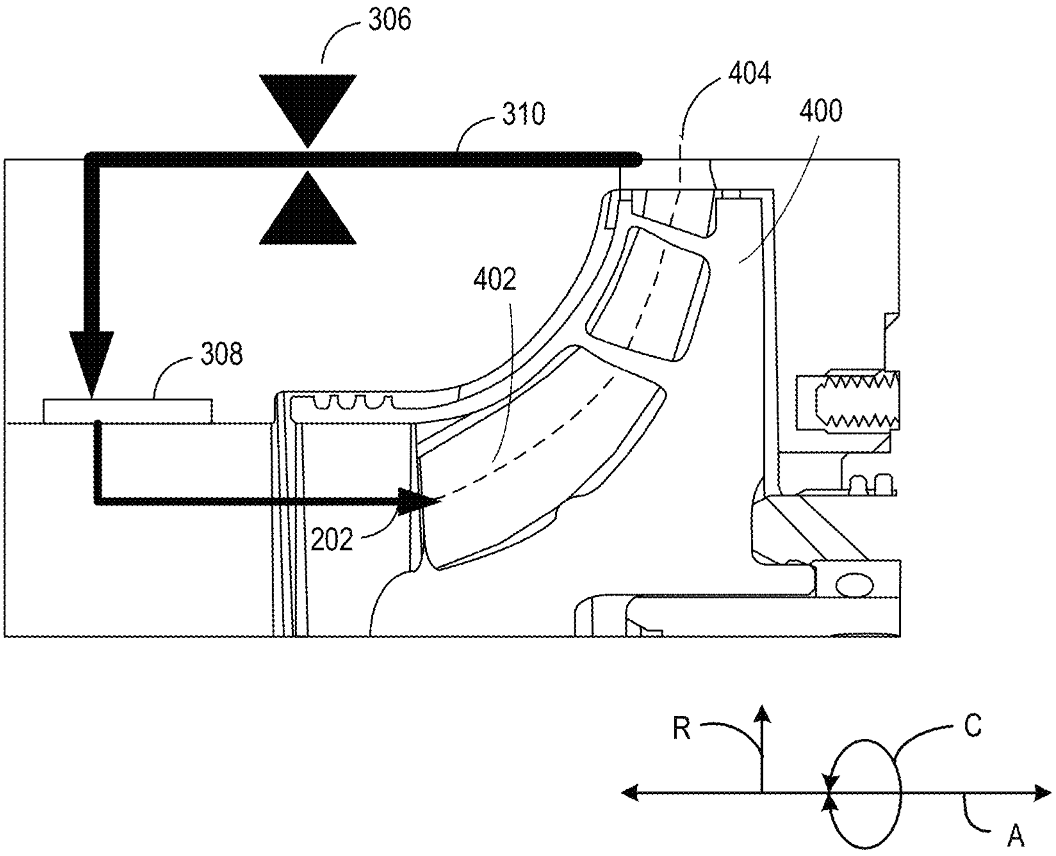
FIG. 4 is a detailed view of a metering valve in a casing of the example gas turbine.

FIG. 4 is a partial view of the thermal transport bus 202, depicting a casing 400, which includes the recirculation flow path 310 and associated recirculation apparatus 350. The formation of the recirculation flow path 310 within the casing 400 is designed such that, in some examples, additional structural components are not needed to facilitate recirculation of the heat exchange fluid, leading to a more compact design. The metering valve 308 is designed such that the metering valve 308 is positioned concentrically with an inner perimeter 402 of the casing 400. The metering valve 308 at least partially surrounds the inner perimeter 402. To open the metering valve 308, the actuator 306 facilitates rotation of the metering valve 308 relative to a central axis 404 of the casing 400. The design of the metering valve 308 and interface with the inner perimeter 402 of the casing 400 are discussed in further detail in FIGS. 6A-8B. In certain examples, the metering valve 308 moves circumferentially (e.g., as a pair of concentric rings, etc.) to open or close the recirculation loop 310. In other examples, the metering valve 308 moves axially (e.g., as a pair of plates, etc.) to open or close the recirculation loop 310.

Figure 5:
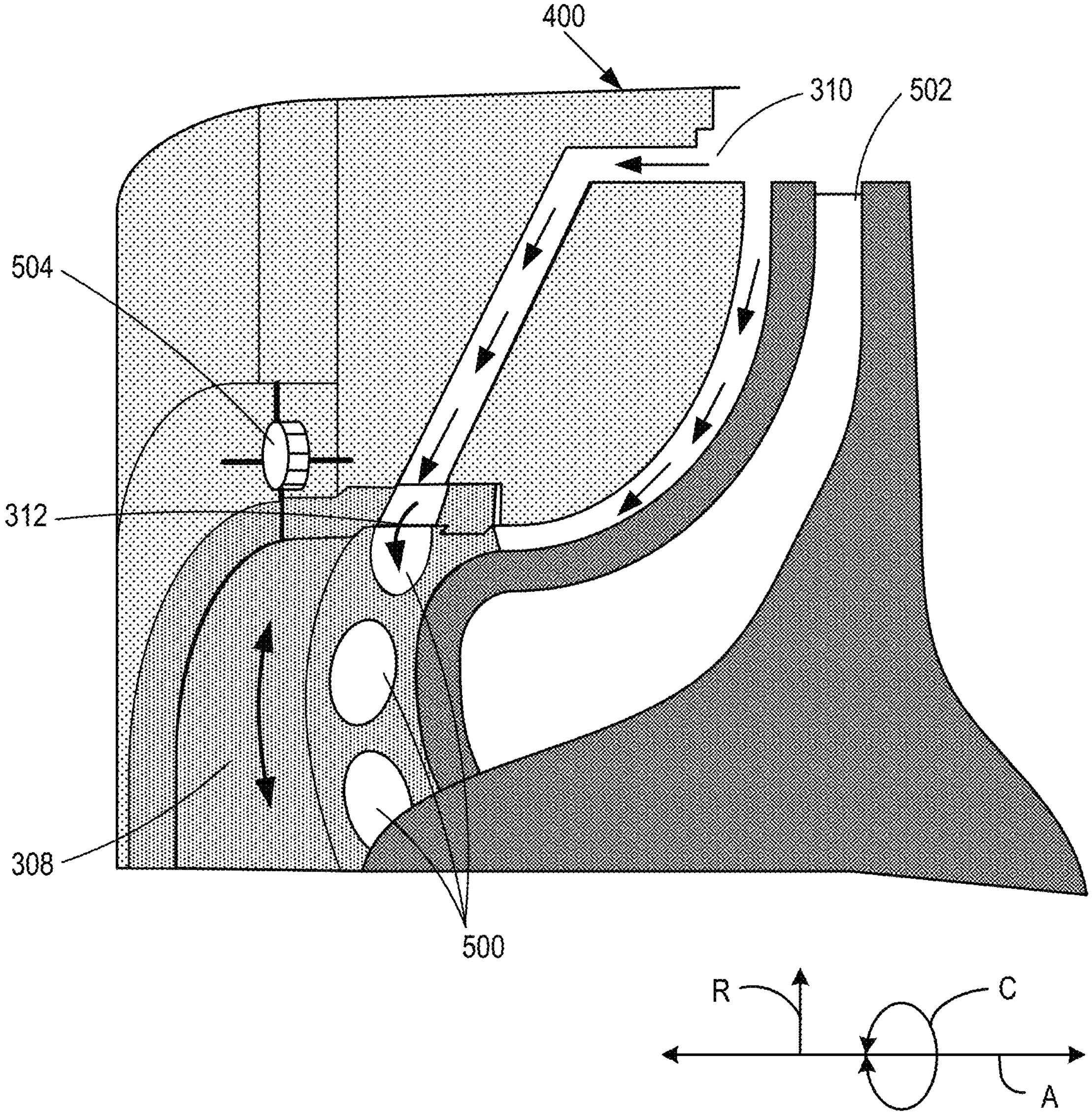
FIG. 5 is an isometric view to show the interface between the metering valve and the engine casing.

FIG. 5 is an isometric view of the metering valve 308 and a portion of the recirculation flow path 310 shown with respect to an impeller 502. In the example of FIG. 5, the metering valve 308 is implemented as a set of concentric rings. The inlet 312 is positioned downstream of the outlet 314 (aimed circumferentially into the page and not visible in this view) such that when the metering valve 308 is in the open position (e.g., one or more holes 500 are aligned with the recirculation loop or flow path 310), the heat exchange fluid can enter the recirculation flow path 310.

The metering valve 308 includes a plurality of openings 500 that are rotationally positionable to provide a full or partial opening for passage of the heat exchange fluid. The status of the metering valve 308 (e.g., open, closed, partially open/partially closed (e.g., open at X %, closed at Y %, etc.)) depends on the relative position between the openings 500 and the engine casing 400. When the openings 500 are aligned with the recirculation flow path 310, the metering valve 308 is open. When the openings 500 are aligned with a solid portion of the casing 400, the metering valve 308 is closed. When the openings 500 are partially aligned with the inlet 312 and partially aligned with the casing 400, the metering valve 308 is partially open.

In the example of FIG. 5, the recirculation flow path 310 is positioned upstream of the pump 204. The recirculation flow path 310 enables changes to the flow parameters of the heat exchange fluid (e.g., temperature, flow rate, pressure, etc.) before the fluid enters the pump 204. It will be understood that the pump 204 includes the impeller 502 which drives the heat exchange fluid through the thermal waste-heat management system 200. Although shown here in conjunction with the impeller 502, it is understood that the recirculation loop 310 and associated valve 308 can be located at alternative and/or additional locations such as intermediate, further upstream, further downstream, etc.

The metering valve 308 movement is driven by a gear(s) 504 (e.g., e.g., positioned apart by 90°, 120°, etc.), the gear(s) 504 mechanically coupled to the actuator 306 (not shown in the view of FIG. 5) within the casing or shroud 400. In the example of FIG. 5, the metering valve 308 is implemented as a ring that can be rotate using the gear(s) 504 to align or mis-align the openings 500 and the outlet 314.

Figure 6A:
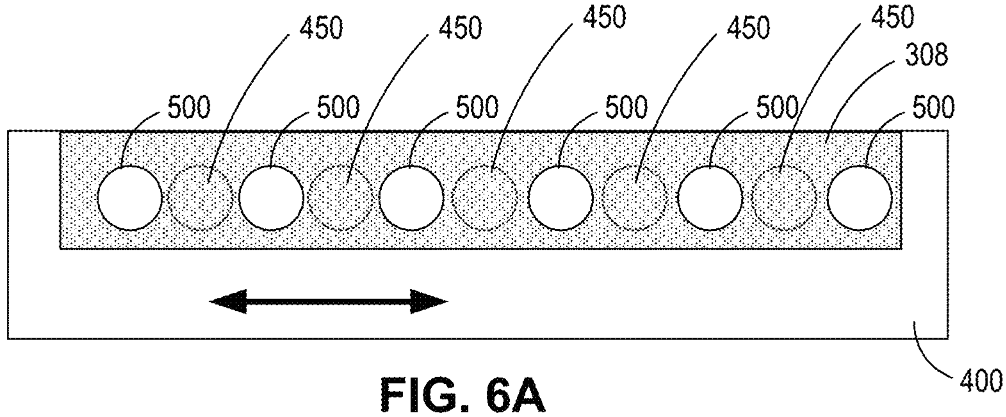
FIGS. 6A-6C, 7A-7C, and 8A-8B show examples of metering valve configurations including open, partially open, and closed configurations.
Figure 6B:
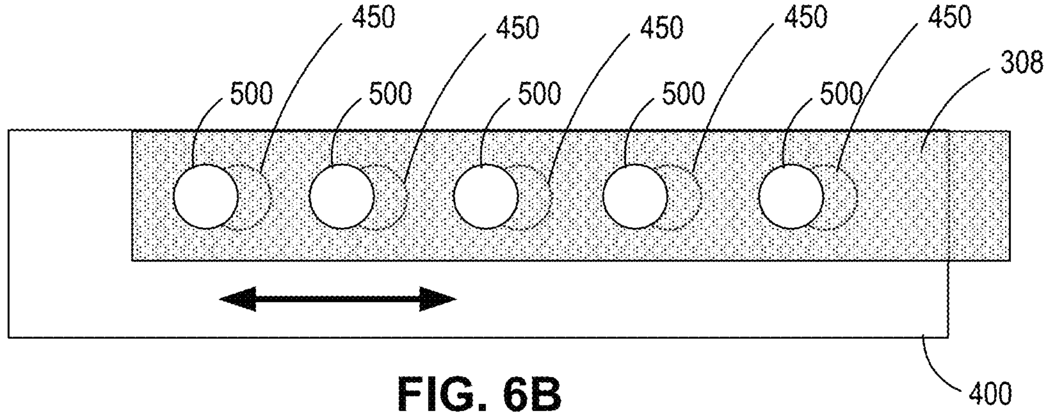
Figure 6C:
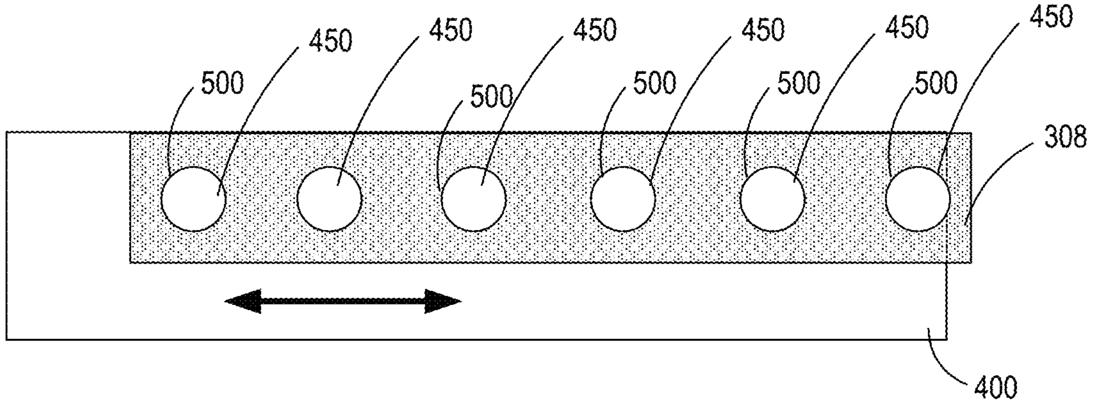
Figure 8A:
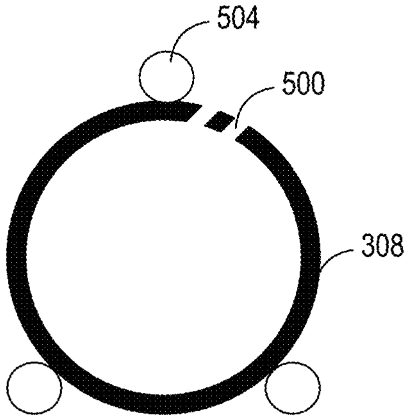

FIGS. 6A-6C show examples of the openings 500 in the metering valve 308. As described above, the metering valve 308 can be implemented as a ring (e.g., such as shown in the example of FIG. 8A) positioned within the casing or housing 400 of the pump 204. The curved wall of the casing 400 can also include holes such that when the actuator 306 moves the metering valve 308, the holes 500 of the metering valve and the holes of the casing 400 do or do not align.

FIG. 6A shows an example configuration of the openings 500 and the casing 400 when the metering valve 308 is in a closed position. In the closed position, there is no alignment between the holes 500 of the metering valve 308 and holes or openings 450 in the casing 400. As such, heat exchange fluid cannot flow through the metering valve 308 and the casing 400 into the recirculation loop 310 (not shown in this view).

FIG. 6B shows an example configuration of the openings 500 of the metering valve 308 and the corresponding openings 450 of the casing 400 when the metering valve 308 is in a partially open position. The partial alignment allows some heat exchange fluid to flow through and into the recirculation loop 310 (not shown in this view.)

FIG. 6C shows the configuration of the openings 500 and the casing 400 when the metering valve 308 is in the open position. When in full alignment (e.g., the open position), the openings 450, 500 align and allow more heat exchange fluid to flow into the recirculation loop 310 than when the openings 450, 500 are in the partially open position (FIG. 6B).

Figure 7A:
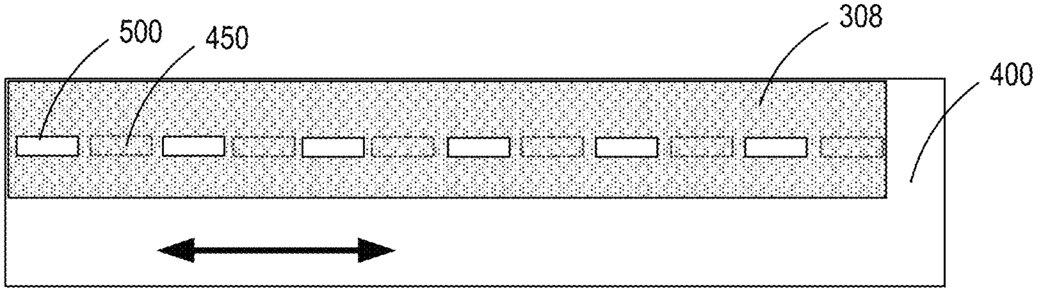
Figure 7B:
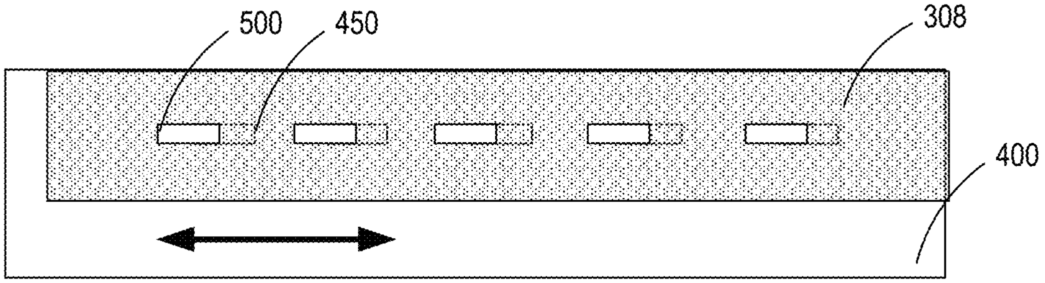
Figure 7C:
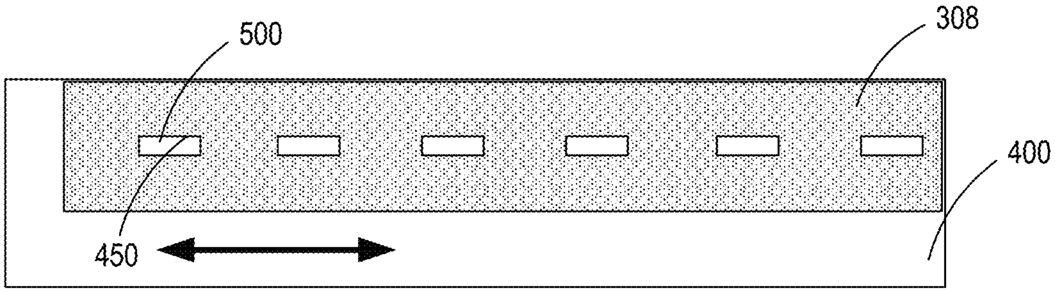

In the examples of FIGS. 6A-6C, the openings 450, 500 are rounded (e.g., circular, oval, etc.). However, the openings 450, 500 can be implemented in a variety of shapes. FIGS. 7A-7C illustrate an alternative implementation of the openings 500 in the metering valve 308 and the openings 450 in the casing 400. The openings 450, 500 in the examples of FIGS. 7A-7C are angular (e.g., rectangular). Otherwise, the examples of FIGS. 7A-7C function similarly to the examples of FIGS. 6A-6C.

FIG. 7A shows an example configuration of the openings 500 and the casing 400 when the metering valve 308 is in a closed position. In the closed position, there is no alignment between the holes 500 of the metering valve 308 and holes or openings in the casing 400. As such, heat exchange fluid cannot flow through the metering valve 308 and the casing 400 into the recirculation loop 310 (not shown in this view).

FIG. 7B shows an example configuration of the openings 500 and the casing 400 when the metering valve 308 is in a partially open position. The partial alignment allows some heat exchange fluid to flow through and into the recirculation loop 310 (not shown in this view.)

FIG. 7C shows the configuration of the openings 500 and the casing 400 when the metering valve 308 is in the open position. When in full alignment (e.g., the open position), the openings 450, 500 align and allow more heat exchange fluid to flow into the recirculation loop 310 than when the openings 450, 500 are in the partially open position (FIG. 6B).

FIG. 8A shows a schematic arrangement of gears 504 and the metering valve 308. In the example of FIG. 8A, three gears 504 are equally spaced one-hundred twenty (120) degrees apart. In other examples, there can be a different number of gears 504 or the spacing can be uneven. The gears 504 are in contact with the outer surface of the metering valve 308 such that when at least one of the gears 504 rotates, the motion is transferred to the metering valve 308, subsequently rotating the metering valve 308. The example of FIG. 8A also depicts a side view of the openings 500. The state or position of the metering valve 308 (e.g., opened, closed, or partially opened) depends on the position of the openings 500 relative to the casing 400 (not shown in this view).

Figure 8B:
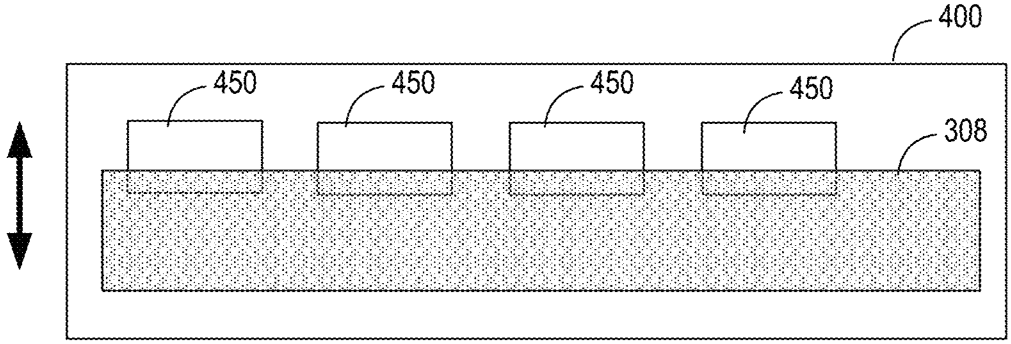

FIG. 8B illustrates an alternative implementation of the metering valve 308. In the example of FIG. 8B, rather than a circumferential motion within the casing 400, the metering valve 308 moves axially with respect to the casing 400. As shown in the example of FIG. 8B, The metering valve is a panel or sheet that moves axially, rather than circumferentially, with respect to the casing 400. Openings 450 in the casing 400 are blocked or exposed based on the position of the metering valve 308 panel with respect to the casing 400. As such, the implementation of FIG. 8B also enables a fully closed, fully open, or partially open flow to the recirculation path 310.

Figure 9:
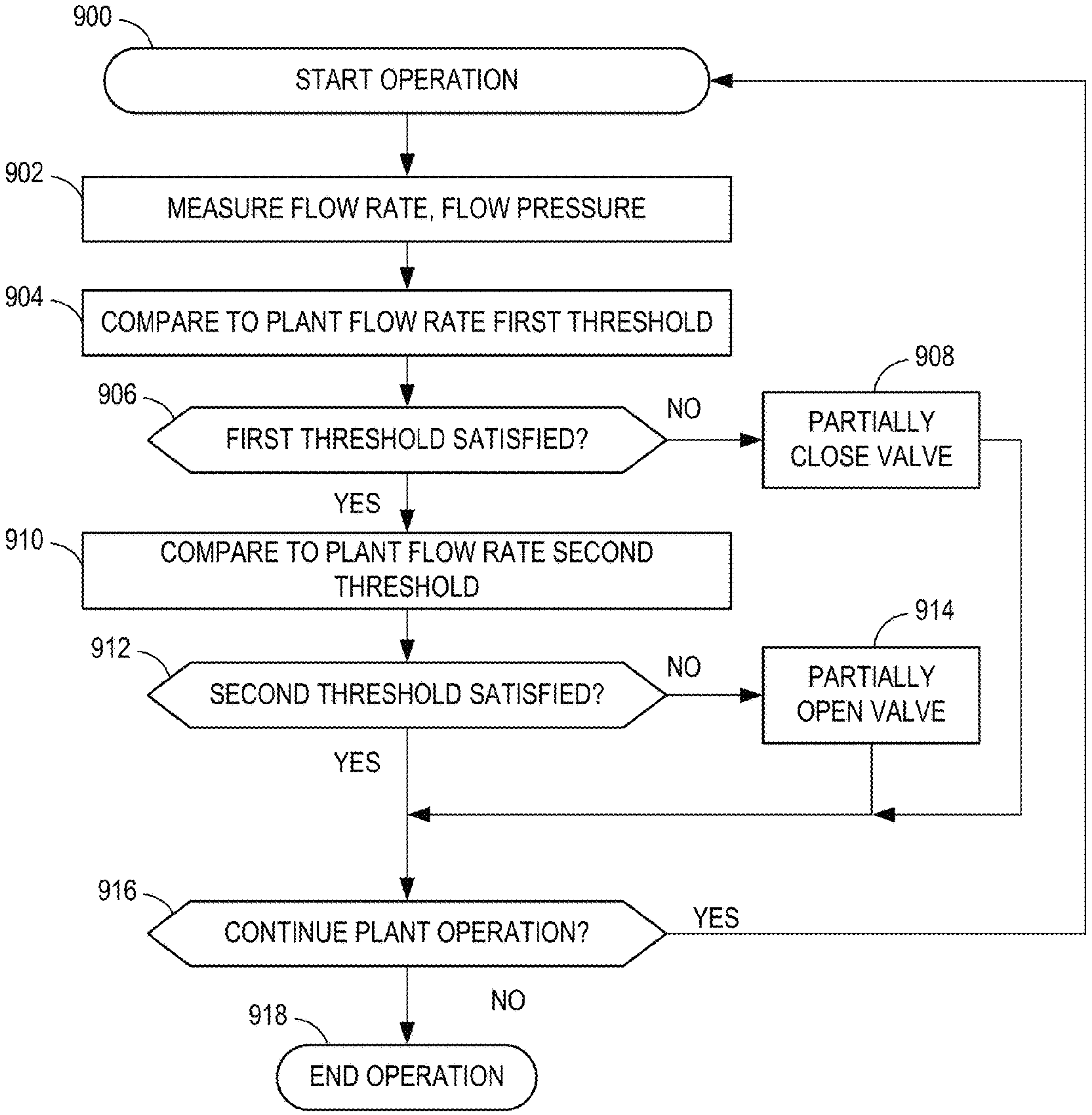
FIG. 9 is an example feedback diagram that can be utilized to control a metering valve position based on flow measurements in a pump.

FIG. 9 is a flow diagram of an example process 900 to control or otherwise position the metering valve 308 to provide access to the recirculation flow path 310. As described above, the recirculation path 310 increases a flow through the compressor section 122, which improves operation of the turbine engine 100 under certain conditions. However, failure to regulate or otherwise control the recirculation path 310 can result in failure or unstable operation of the engine under other conditions. As such, control of the metering valve 308 based on pressure ratio and stall threshold to achieve a certain mass or volume flow rate is desirable.

As described above, control of fluid flow through the recirculation path 310 can be facilitated via the controller 304 moving the actuator 306 (e.g., with the gear 504) to operate the metering valve 308 to align openings 450, 500 as open, partially open, or closed. As such, the casing 400 itself serves to interact with the metering valve 308, reducing the structure involved, and remaining structure can be incorporated within the available space of the casing 400. Thus, greater control, reduced infrastructure, reduced size, and reduced weight are provided. Control can be based on one or more measurements and/or parameters including pressure (e.g., pressure ratio, etc.), flow rate (e.g., mass flow rate, volume flow, etc.), temperature, etc. The method 900 describes an example of such valve 308 control.

At block 902, the sensor(s) 302 measure the flow pressure and flow rate of the heat exchange fluid. For example, the heat exchange fluid flows through the pump 204, which includes the sensors 302. In some examples, the sensors 302 are transducers that send an electrical signal to the controller 304, which computes the flow pressure and flow rate of the heat exchange fluid. In other examples, the sensors 302 can be venturis, thermocouples, etc., that measure characteristics of the heat exchange fluid to be processed by the controller 304.

At block 904, the measurements are compared to a first threshold in the controller 304. For example, the controller 304 can determine whether the flow rate satisfies the first threshold in response to the sensor 302 delivering a signal associated with the flow rate being greater than or equal to a lower tolerance limit (e.g., a minimum acceptable flow rate) of the target flow rate associated with the target operation flow rate of the pump 204. The first threshold can be based on engine requirements, flight stage, etc., as pressure ratio and fluid flow balance against an aircraft stall threshold, for example. At block 906, when the flow rate of the heat exchange fluid fails to satisfy the first threshold, the example process 900 moves to block 908, at which the controller 304 sends instructions to the actuator 306 to partially close the metering valve 308.

In response to the flow rate of the heat exchange fluid satisfying the first threshold at block 906, the process 900 advances to block 910, at which the sensor 302 measurements are compared to a second threshold. For example, the controller 304 can determine whether the flow rate satisfies the second threshold in response to the sensor 302 delivering a signal associated with the flow rate being less than or equal to a higher tolerance limit (e.g., a maximum acceptable flow rate) of the target flow rate associated with the target operational flow rate of the pump 204. When the second threshold is not satisfied, at block 912, the controller 304 sends instructions to the actuator 306 to partially open the metering valve 308. When the second threshold is satisfied, the process 900 proceeds to block 916, at which a decision of whether to continue the operation of the thermal waste-heat management system is presented. At block 916, the controller 304 determines whether to continue operating. When operation is to be continued, the process 900 returns to block 902. Otherwise, the process 900 moves to block 918 and operation is terminated.

As such, thresholds can be defined based on pressure ratio and fluid flow to maintain a certain pressure and flow (e.g., mass or volume fluid flow rate) while avoiding a stall threshold, which can introduce instability into the system. The controller 304 triggers the actuator 306 to move the metering valve 308 accordingly to allow some or no fluid flow into the recirculation loop or conduit 310. The controller 304 can activate the actuator 306 to move the metering valve 308 to position the valve 308 as fully open, fully closed, or partially open (e.g., by positioning the openings 500 in the metering valve 308 with respect to the openings 450 in the casing 400) to allow a desired amount of the heat exchange fluid to enter the recirculation path (e.g., conduit) 310 to affect the desired mass or volume flow rate with respect to pressure ratio.

Figure 10:
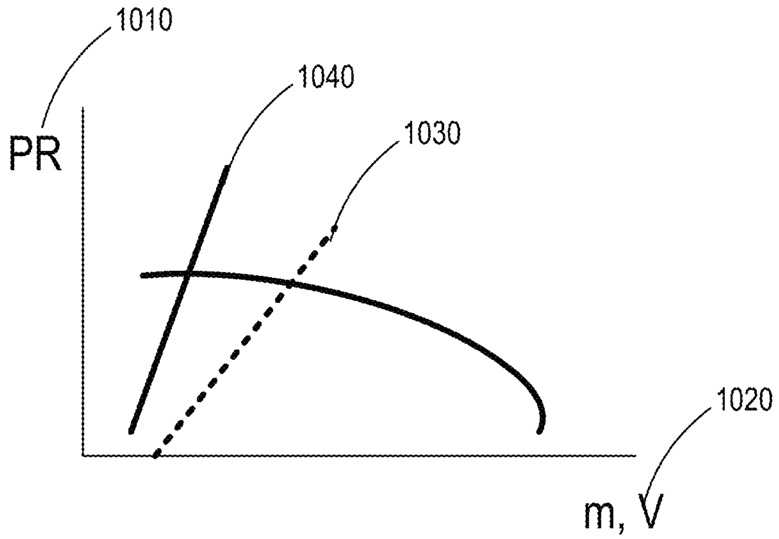
FIG. 10 shows an example graph of pressure ratio with respect to fluid flow rate.

FIG. 10 shows an example graph of pressure ratio (PR) 1010 versus fluid flow rate (e.g., mass flow rate (m) and/or volume flow rate (V)) 1020. The controller 304 controls the actuator 306 and the metering valve 308 to adjust recirculation flow to achieve a balance of pressure ratio (e.g., 1, 2, 2.5, 3, 5, 10, etc.) and flow rate (e.g., 0.1, 0.2, 0.3, 0.5 kilogram/second (kg/s), etc.) with respect to a stall threshold 1030, at which operation becomes unstable. As described above, by balancing PR and m and/or V flow rate, while avoiding the stall threshold 1030, pump 204 and engine 100 operation can be improved using the conduit of the recirculation loop 310 at varying degrees of opening with respect to the casing 400.

As shown in the example of FIG. 10, an operating line 1040 represents operating conditions of the plant (e.g., heat exchanger(s), passages, etc., associated with the pump 204 and the engine 100). A distance between the stall line 1030 and the operating line 1040 corresponds to a degree of opening of the metering valve 308. Based on the stall line or threshold 1030 and plant requirements, a set of positions can be programmed for the metering valve 308 such that operation at a certain fluid flow 1020 and pressure ratio 1010 involves opening of the metering valve 308 at X %. The controller 304 can determine the valve 308 position based on the stall line 1030, pressure ratio 1010, fluid flow 1020, etc.

Figure 11:
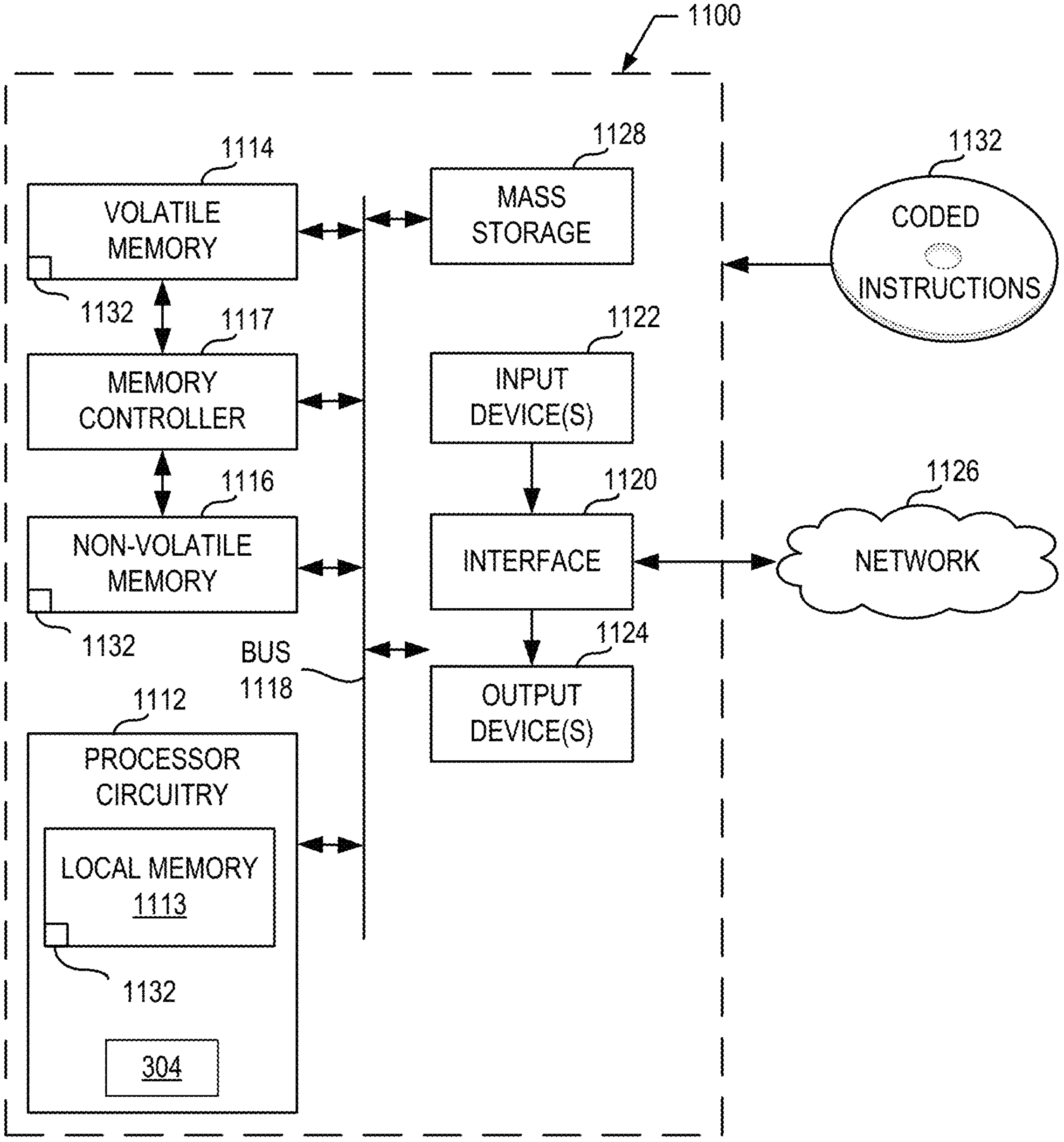
FIG. 11 is a block diagram of an example processor platform structured to execute and/or instantiate the machine readable instructions and/or the operation of FIG. 9 to configure the metering valve.

FIG. 11 is a block diagram of an example processor platform 1100 structured to execute and/or instantiate the machine readable instructions and/or the operation of FIG. 9 to configure the controller 304 to control the metering valve 308. The processor platform 1100 can be, for example, a digital computer (e.g., a full authority digital engine control (FADEC), an electronic engine controller (EEC), an engine control unit (ECU), etc.) or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, field programmable gate arrays (FPGAs), microprocessors, central processing units (CPUs), general processing units (GPUs), digital signal processors (DSPs), and/or microcontrollers from any desired family or manufacturer. The processor circuitry 1112 may be implemented by one or more semiconductor based (e.g., silicon based) devices. In this example, the processor circuitry 1112 implements the controller 304.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS®) Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a pressure sensor, a temperature sensor, a position sensor, a microphone, a camera (still or video), a keyboard/pad, a button, a touchscreen, etc. In this examples, the input device(s) implement the sensors 302.

One or more output devices 1124 are also connected to the interface circuitry 1120 of the illustrated example. The output device(s) 1124 can be implemented, for example, by an actuator(s), display devices, etc. In this example, the output device(s) 1124 implement the actuator(s) 306. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, Airband or aircraft band radio, satellite, a digital datalink system (e.g., Aircraft Communications Addressing and Reporting System (ACARS)), etc.

The processor platform 1100 of the illustrated example also includes one or more mass storage devices 1128 to store software and/or data. Examples of such mass storage devices 1128 include magnetic storage devices, optical storage devices, floppy disk drives, HDDs, redundant array of independent disks (RAID) systems, solid state storage devices such as flash memory devices and/or SSDs, and DVD drives.

The machine readable instructions 1132, which may be implemented by the machine readable instructions of FIG. 9, may be stored in the mass storage device 1128, in the volatile memory 1114, in the non-volatile memory 1116, and/or on a removable non-transitory computer readable storage medium such as a CD or DVD.

From the foregoing, it will be appreciated that example systems, methods, apparatus, and articles of manufacture have been disclosed that enable a recirculation loop at an inlet to a pump in a thermal waste-heat management system. With a valve incorporated into the casing of the existing system, the overall engine is compact and does not require additional structures to facilitate the recirculation process of the thermal waste-heat management system heat exchange fluid. Moreover, adding a recirculation process at the inlet to the pump enables the pump to operate at a higher flow compared to the flow of the thermal waste-heat management system. The recirculation process allows for flexibility in starting the pump, preventing throttling the flow. Having this additional flexibility to start the pump built into the casing avoids issues of bulkiness and extra weight, which is critical to engines involved in aerodynamic applications.

An example apparatus can include a means for recirculating a fluid over a pump, means for metering the fluid at an inlet to the means for recirculating, and means for operating the pump at a first flow rate, the first flow rate greater than a second flow rate, the second flow rate corresponding to a flow rate of a thermal waste-heat management system of a turbofan engine. The example means for recirculating can be implemented by the recirculation flow path 310, for example. The means for metering can be implemented by the metering valve 308, for example. The means for operating can be implemented by the controller 304 (e.g., executing process instructions 900), alone or with the actuator 306, for example. In certain examples, the apparatus includes means for sensing at least one of a pressure, a flow rate, or a temperature of the fluid. The means for sensing is to provide an input to the means for operating and can be implemented by one or more of the sensors 302, for example.

Further aspects of the presently disclosed subject matter are provided by the following clauses:

Example 1 is an engine including a compressor, a pump, and a casing for at least one of the pump or the compressor. The casing includes a conduit formed in a wall of the casing, and the conduit is to define a recirculation flow path for a fluid at least partially within the wall of the casing. The engine further includes a valve positioned at an inlet to the recirculation flow path; and an actuator operatively connected to the valve and configured to adjust a position of the valve among at least one of open, partially open, or closed, the valve to allow passage of at least a portion of the fluid when at least one of open or partially open.

Example 2 includes the engine of any preceding clause, wherein the valve is positioned concentric with an inner perimeter of the casing.

Example 3 includes the engine of any preceding clause, wherein the actuator is communicatively coupled to a controller, the controller configured to, based on input from a sensor: cause the actuator to at least partially open the valve in response to a flow rate of the fluid satisfying a first flow rate threshold; and cause the actuator to at least partially close the valve in response to the flow rate of the fluid satisfying a second flow rate threshold.

Example 4 includes the engine of any preceding clause, further including at least one sensor.

Example 5 includes the engine of any preceding clause, further including the controller.

Example 6 includes the engine of any preceding clause, wherein an inner surface of the casing includes a first plurality of openings and wherein the valve includes a second plurality of openings, the actuator to align the second plurality of openings with respect to the first plurality of openings to at least one of open, partially open, or close the valve.

Example 7 includes the engine of any preceding clause, wherein the actuator includes at least one of a spring-loaded system, a stepper motor, or a solenoid.

Example 8 includes the engine of any preceding clause, wherein the actuator is mechanically coupled to a gear to move the valve.

Example 9 includes the engine of any preceding clause, wherein the valve is a ring positioned and moveable concentric with the conduit formed in the casing, and wherein motion of the valve between positions is rotational along a circumferential axis.

Example 10 includes the engine of any preceding clause, wherein motion of the valve between positions is axial.

Example 11 is a system including: a metering valve incorporated into a casing for at least one of a compressor or a pump, the metering valve located at an inlet for a fluid recirculation loop, the fluid recirculation loop located at least partially in a wall of the casing; and processor circuitry to control the metering valve based on a position determined from sensor input regarding a pressure and a flow rate, the processor circuitry to control the metering valve to regulate flow of a fluid through the fluid recirculation loop.

Example 12 includes the system of any preceding clause, further including: an actuator to control the position of the metering valve, the processor circuitry communicatively coupled to the actuator, the actuator to cause the metering valve to move to the position determined by the processor circuitry.

Example 13 includes the system of any preceding clause, further including: a first sensor to measure the pressure of the fluid; a second sensor to measure the flow rate of the fluid; and a third sensor to measure a temperature of the fluid, wherein the processor circuitry is to calculate a pressure ratio of at least one of the compressor or the pump based on the pressure, the flow rate, and the temperature, the position for the metering valve based on the pressure ratio.

Example 14 includes the system of any preceding clause, wherein the metering valve at least partially surrounds an inner perimeter of the casing, the metering valve to rotate relative to a central axis of the inner perimeter of the casing.

Example 15 includes the system of any preceding clause, wherein the fluid recirculation loop includes a fluid pathway contained in the casing, the fluid pathway to channel the fluid to a location upstream of the inlet.

Example 16 includes the system of any preceding clause, wherein the fluid recirculation loop is not accessible when the metering valve is in a closed position.

Example 17 includes the system of any preceding clause, wherein the metering valve can be positioned as fully closed, fully open, and partially open.

Example 18 includes the system of any preceding clause, wherein the metering valve is a ring positioned within the casing, the ring including a first plurality of openings and movable circumferentially to at least partially align with a second plurality of openings in the casing to allow or restrict movement of the fluid into the fluid recirculation loop.

Example 19 is a controller apparatus including: memory circuitry; instructions in the memory circuitry; and processor circuitry to execute the instructions to: compare a measured fluid flow rate to a threshold; and based on the comparison, adjust a position of a valve with respect to a plurality of openings in a pump casing to meter flow of a heat exchange fluid into a recirculation loop for the pump, the valve arranged in an inlet of the recirculation loop formed within the pump casing.

Example 20 includes the controller apparatus of any preceding clause, wherein the threshold is a stall threshold.

Example 21 is an apparatus including: means for recirculating a fluid with respect to a pump; means for metering the fluid at an inlet to the means for recirculating; and means for operating the pump at a first flow rate, the first flow rate greater than a second flow rate, the second flow rate corresponding to a flow rate of a thermal waste-heat management system of a turbofan engine.

Example 22 includes the apparatus of any preceding clause, wherein the means for recirculating is incorporated into a casing of the turbofan engine.

Example 23 includes the apparatus of any preceding clause, further including: means for sensing at least one of a pressure, a flow rate, or a temperature of the fluid, the means for sensing to provide an input to the means for operating.

Example 24 includes the casing of any preceding clause, wherein a material of the valve and a material of the conduit are compatible.

Example 25 includes the casing of any preceding clause, wherein the material of the valve and the material of the conduit are compatible based on similar coefficients of thermal expansion.

Example 25 includes the casing of any preceding clause, wherein the threshold is a stall threshold.

Example 26 includes the casing of any preceding clause, wherein a proportion of pressure ratio to fluid flow is compared to a stall threshold to determine a valve position.

Example 27 includes the casing of any preceding clause, wherein the fluid flow includes at least one of a mass fluid flow or a volume fluid flow.

Example 28 is a casing including a conduit formed in a wall of the casing, the conduit to define a recirculation flow path for a fluid at least partially within the wall of the casing; a valve positioned at an inlet to the recirculation flow path; and an actuator operatively connected to the valve and configured to adjust a position of the valve among at least one of open, partially open, or closed, the valve to allow passage of at least a portion of the fluid when at least one of open or partially open.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An engine comprising:

a centrifugal;

a pump including an impeller;

a casing for the pump, the casing including a conduit formed in a wall of the casing, the conduit to define a recirculation flow path for a fluid to the pump at least partially within the wall of the casing;

a valve positioned at an inlet to the recirculation flow path; and an actuator operatively connected to the valve and configured to adjust, based on a balance between a pressure ratio and a flow rate of the fluid with respect to a stall threshold, a position of the valve among at least one of open, partially open, or closed with respect to a first plurality of openings in the casing, the valve to allow passage of at least a portion of the fluid through at least a portion of the plurality of openings when at least one of open or partially open, wherein the valve is formed from a first concentric ring and a second concentric ring, the first concentric ring formed in an inner perimeter of the wall of the casing and including the first plurality of openings, the second concentric ring including a second plurality of openings, and the second concentric ring controlled by the actuator to move with respect to the first concentric ring to adjust the position of the valve circumferentially among the at least one of open, partially open, or closed, and wherein the actuator is configured to at least partially open the valve in response to the flow rate of the fluid satisfying a first flow rate threshold and at least partially close the valve in response to the flow rate of the fluid satisfying a second flow rate threshold, the first flow rate threshold and the second flow rate threshold set with respect to the balance between the pressure ratio and the flow rate of the fluid with respect to the stall threshold, the actuator to control the valve to manage storage and transfer of thermal energy in the recirculation flow path.

2. The engine of claim 1, wherein the actuator is communicatively coupled to a controller, the controller configured to, based on input from a sensor:

cause the actuator to at least partially open the valve in response to the flow rate of the fluid satisfying the first flow rate threshold; and cause the actuator to at least partially close the valve in response to the flow rate of the fluid satisfying the second flow rate threshold.

3. The engine of claim 2, further including the sensor.

4. The engine of claim 2, further including the controller.

5. The engine of claim 1, wherein the actuator is to align the second plurality of openings with respect to the first plurality of openings to at least one of open, partially open, or close the valve.

6. The engine of claim 1, wherein the actuator includes at least one of a spring-loaded system, a stepper motor, or a solenoid.

7. The engine of claim 1, wherein the actuator is mechanically coupled to a gear to move the valve.

8. The engine of claim 1, wherein motion of the valve between positions is rotational along a circumferential axis.

9. The engine of claim 1, wherein motion of the valve between positions is axial.

10. The engine of claim 1, further including a heat exchanger positioned with respect to the recirculation flow path and the pump.

* * * * *